(12) United States Patent
Choi

(10) Patent No.: US 9,867,495 B2
(45) Date of Patent: Jan. 16, 2018

(54) AUTO COFFEE DRIP APPARATUS

(71) Applicant: Sun-Ho Choi, Seongnam-si (KR)

(72) Inventor: Sun-Ho Choi, Seongnam-si (KR)

( * ) Notice: Subject to any disclaimer, the term of this patent is extended or adjusted under 35 U.S.C. 154(b) by 410 days.

(21) Appl. No.: 14/670,431

(22) Filed: Mar. 27, 2015

(65) Prior Publication Data

US 2015/0289712 A1 Oct. 15, 2015

(30) Foreign Application Priority Data

Apr. 15, 2014 (KR) .................. 10-2014-0044726

(51) Int. Cl.
*A47J 31/00* (2006.01)
*A47J 31/46* (2006.01)
*A47J 31/54* (2006.01)
*A47J 31/057* (2006.01)

(52) U.S. Cl.
CPC ............. *A47J 31/46* (2013.01); *A47J 31/057* (2013.01); *A47J 31/54* (2013.01); *A47J 31/0573* (2013.01)

(58) Field of Classification Search
CPC ........................... A47J 31/057; A47J 31/0573
USPC .......................................... 99/306, 304, 307
See application file for complete search history.

(56) References Cited

U.S. PATENT DOCUMENTS

| 4,055,114 | A | * | 10/1977 | Kats | .................... | A47J 31/0573 |
| | | | | | | 99/280 |
| 4,634,838 | A | * | 1/1987 | Berz | ................... | A47J 31/0576 |
| | | | | | | 222/146.5 |
| 6,067,894 | A | * | 5/2000 | Eugster | ................. | A47J 31/404 |
| | | | | | | 99/280 |
| 8,752,476 | B2 | * | 6/2014 | Lin | ......................... | A47J 31/44 |
| | | | | | | 99/281 |
| 9,375,113 | B2 | * | 6/2016 | Sachtleben | ............. | A47J 31/06 |
| 2011/0048241 | A1 | * | 3/2011 | Smit | ...................... | A47J 31/50 |
| | | | | | | 99/288 |

FOREIGN PATENT DOCUMENTS

| JP | 3173367 U | | 2/2012 | | |
| KR | 10-1145137 | * | 5/2012 | .......... | A47J 31/0573 |
| KR | 10-1281648 | | 7/2013 | | |

* cited by examiner

*Primary Examiner* — Reginald L Alexander
(74) *Attorney, Agent, or Firm* — Revolution IP, PLLC

(57) ABSTRACT

The present invention provides an auto coffee drip apparatus comprising: a housing; a dripper tray module which is fixed to an external one side of the housing and in which a dripper storing the coffee powders is seated; a drip head module which is provided on an upper part of the dripper tray module so as to be spaced apart by a predetermined interval and injects water into the dripper; and a boiler module which is provided inside the housing and is connected to the drip head module to supply the heated water to the drip head module.

13 Claims, 11 Drawing Sheets

AUTO COFFEE DRIP APPARATUS

CROSS-REFERENCE TO RELATED APPLICATION

This application claims under 35 U.S.C. §119(a) the benefit of Korean Patent Application No. 10-2014-0044726 filed Apr. 15, 2014, the entire contents of which are incorporated herein by reference.

BACKGROUND (a) Technical Field

The present disclosure relates to an auto coffee drip apparatus. More particularly, it relates to an auto coffee drip apparatus which enables a user to automatically and readily enjoy hand drip coffee, by extracting drip coffee and tea through automatically calculated recipes and by automatically and readily providing drip drink optimized for taste of a user through the control of setting.

(b) Background Art

A coffee extraction method is generally divided into an espresso extraction type using a pressurized water pump and a drip extraction type using the water flow falling by gravity.

In the drip extraction type, there is an extraction way of using a coffee maker and a hand drip way in which a user directly controls the water flow and the injection direction through a kettle.

To obtain brewed coffee through a coffee maker, a filter such as a drip paper 612 is mounted on a hopper of the coffee maker, and powders of coffee beans are put into the filter. Further, when the water is boiled and is poured into a tank provided in the hopper, the boiled water is provided to the powders of coffee beans within the filter, and the coffee is brewed and is stored in a coffee pot at the lower part of the coffee maker. A heater for applying heat to the coffee pot is installed at the lower part of the coffee pot to keep the brewed coffee stored in the coffee pot warm so as to be maintained at a constant temperature.

In this way, in the case of using the coffee maker, there is an advantage in that it is possible to easily extract the brewed coffee by providing the powders of the coffee beans and water to the coffee maker and it is possible to keep warm the brewed coffee over a long period of time.

However, in the case of extracting a large quantity of brewed coffee and keeping it warm, there is a problem in that taste and fragrance of the brewed coffee are lowered over time, and it has a burnt-taste in a severe case.

Further, when extracting the brewed coffee, in order to infuse the brewed coffee, the coffee is extracted using all the water supplied to the tank. That is, the brewed coffee is extracted while the water passes through the coffee powders over a long period of time. When extracting the brewed coffee in this way, only the effective ingredients contained in the coffee powders are extracted at the initial extraction of the brewed coffee, but as the time of extracting the brewed coffee becomes longer, the harmful ingredients contained in the coffee powders are extracted, and miscellaneous taste is mixed with the extraction liquid.

Also, there is a problem in that, since water used for the extraction is put into the coffee powders without rest during extraction of the brewed coffee, the extraction liquid is discharged to the coffee pot, without sufficiently extracting the efficient ingredients of the coffee.

The hand drip coffee is extracted in a way in which a filter is fixed to a dripper, and after putting the grinding beans therein, a user pours the heated water by a kettle to extract the coffee liquid. Such a hand drip way has an advantage in that a user adjusts the water injection mode by the use of the kettle depending on characteristics of each bean, thereby being able to maximize the unique taste of coffee. However, there are problems in that, due to the characteristics of the hand drip, there are different recipes for each person, resolution of an action of drawing the water flow of the kettle is individually degraded, and a personal condition affects the taste of coffee.

Further, in the hand drip coffee, since a user should directly inject the water through the kettle, there is a problem in that it is not possible to carry out another work when the user extracts the drip coffee.

Further, since the hand drip way can obtain the extraction liquid which can maximize the taste of the coffee beans only through the practice of a long period of time, there is a problem in that it is difficult for a general people to commonly use the hand drip way.

(Patent Document 0001) Korean Patent No. 1281648 10

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides an auto coffee drip apparatus which enables a user to automatically and readily enjoy the hand drip coffee, by extracting drip coffee and tea through automatically calculated recipes and by automatically and readily providing drip drink optimized for taste of a user through the control of setting.

The object of the present invention is not limited thereto, and other objects which have not been mentioned will be clearly understood by those skilled in the art from the following description.

In a preferred embodiment, an auto coffee drip apparatus for achieving the above-mentioned object of the present invention includes: a housing; a dripper tray module which is fixed to external one side of the housing and in which a dripper storing the coffee powders is seated; a drip head module which is provided on an upper part of the dripper tray module so as to be spaced apart by a predetermined interval and injects water into the dripper; and a boiler module which is provided inside the housing and is connected to the drip head module to supply the heated water to the drip head module.

At this time, the drip head module may include a frame at least partially exposed to the front outside of the housing, a nozzle section which is provided on one side of the exposed portion of the frame to inject the water, a rotary drive unit which rotates the nozzle section, a lifting drive unit which raises or lowers the frame to adjust the height of the nozzle section, and a water transporting section which transports the water.

Further, the rotary drive unit may include a first rotary drive unit for rotating the nozzle section, and a second rotary drive unit for linearly moving the nozzle section.

Further, the nozzle section may include a main body, a connecting section and a nozzle section. The main body is formed longer in a lengthwise direction along forward and backward directions of the housing, is formed with an insertion groove formed longer along the lengthwise direction on the lower one side, and is formed with through-holes provided to correspond to terminal ends of both sides of the lengthwise direction, respectively. The connecting section protrudes to the upper part of the main body and is connected to the water transporting section to provide a passage through which the water can flow, and is intended to transmit the rotational force generated by the first rotary drive unit to the nozzle section. The nozzle unit is inserted into the insertion groove and linearly moves along the lengthwise direction of the insertion groove.

Further, the first rotary drive unit may include a first spur gear which is coupled to an upper end of the connecting section of the nozzle section to rotate the nozzle section, a first pinion gear which is provided so as to mesh with the first spur gear to rotate the first spur gear, and a first motor which transmits a rotational force to the first pinion gear.

Further, the second rotary drive unit may include: a second spur gear which has the same rotary shaft as the first spur gear and is provided such that the connecting section of the nozzle section penetrates therethrough; a second pinion gear which is disposed so as to mesh with the second spur gear to rotate the second spur gear; a second motor which transmits a rotational force to the second pinion gear; a first bevel gear which is coupled to the second spur gear and rotates together with the rotation of the second spur gear; a second bevel gear which is connected to the first bevel gear in a direction perpendicular to the lengthwise direction of the nozzle section and rotates together with rotation of the first bevel gear; and a lead screw which is connected to a rotation center axis of the second bevel gear in the same direction as the lengthwise direction of the nozzle section and is provided to penetrate through a pair of through-holes formed in the main body of the nozzle section to rotate together with the second bevel gear, and is formed with screw threads along the lengthwise direction to linearly move the nozzle section.

Further, in the insertion groove of the main body, a guide rail is further formed along the lengthwise direction, and a protrusion corresponding to the guide rail may be further included on the upper one side of the nozzle section.

Further, the apparatus may further include a nozzle fixing section which is coupled to the nozzle section, and is formed with a protrusion corresponding to the screw thread of the lead screw so as to protrude.

Further, the apparatus may further include an elastic unit which elastically supports the nozzle fixing section to the lead screw side.

In addition, the nozzle section may include a first hose connecting section which is provided on the side of the main body so as to protrude and discharges the water flowing-in through the connecting section to the outside of the main body, a second hose connecting section which is provided on a lateral surface of the nozzle section to allow the water discharged from the first hose connecting section to flow in, and a hose which connects the first and second connecting sections, and the nozzle of the nozzle section may be provided so as to be connected to the second hose connecting section to inject the water in a direction of gravity.

Further, the lifting drive unit may include a fixing frame which is fixed to an internal one side of the housing, a support column which is provided so as to be coupled to the frame through the one side of the fixing frame and is vertically formed with a rack gear, a third pinion gear which is provided so as to mesh with the first rack gear of the support column to vertically raise and lower the support column, and a third motor which transmits the rotational force to the third pinion gear.

Further, the drip head module may further include at least one of a laser module, an image sensor and a lighting section for measuring a surface height of the coffee powders stored in the dripper.

Further, on one side of the dripper, a bar code or a QR code, in which coffee powder information and drip information are input, may be further provided, and the image sensor may recognize the bar code or the QR code.

Further, on one side of the dripper tray module, a weight sensor for measuring the coffee powder and a quantity of injection of water injected into the dripper may be further provided.

Further, on the lower part of the dripper tray module, an openable waterspout for discharging the extraction liquid extracted from the dripper to the outside may be further provided.

Also, the openable waterspout may include a waterspout section which stores and distributes the extraction liquid extracted from the dripper provided in the lower part of the dripper tray module, a second rack gear which is formed on one side of the waterspout section, a fourth pinion gear which is provided so as to mesh with the second rack gear to linearly move the waterspout section in one direction, a fourth motor which is connected to the fourth pinion gear to transmit a rotational force to the fourth pinion gear, and a drain pipe which is provided on one side of the waterspout section to discharge the extraction liquid to the outside.

Also, on the internal lower one side of the housing corresponding to a position at which the dripper tray module is provided, a drain water trench module for recovering the extraction liquid discharged via the drain pipe and the water arbitrarily flowing out of the nozzle section may be further provided, and on one side of the housing in which the drain water trench module is provided, a drain hole may be formed so that the extraction liquid or the water can flow into the drain water trench module.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
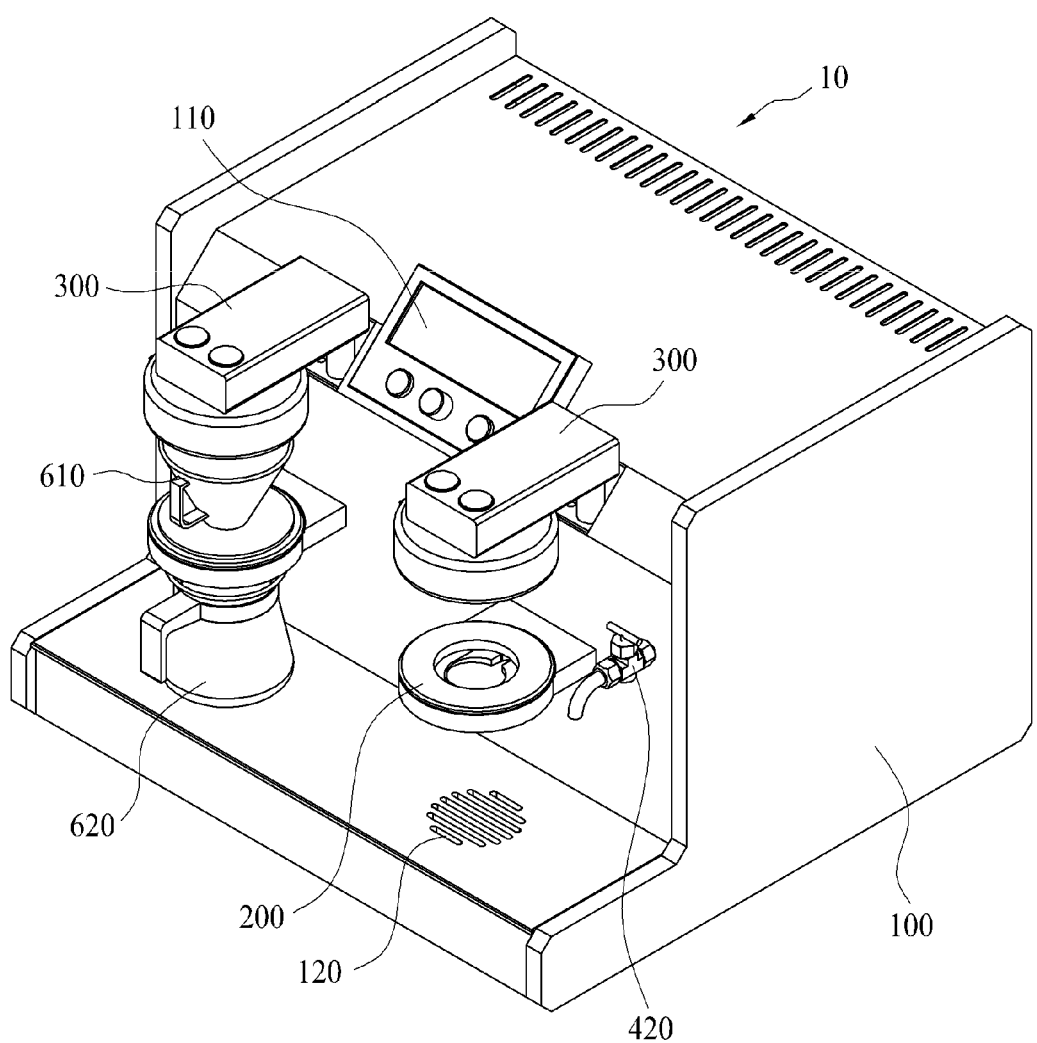
FIG. 1 is a perspective view of an auto coffee drip apparatus according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, preferred embodiments of the present invention will be described in detail with reference to the accompanying drawings.

Configuration of Auto Coffee Drip Apparatus

Figure 2:
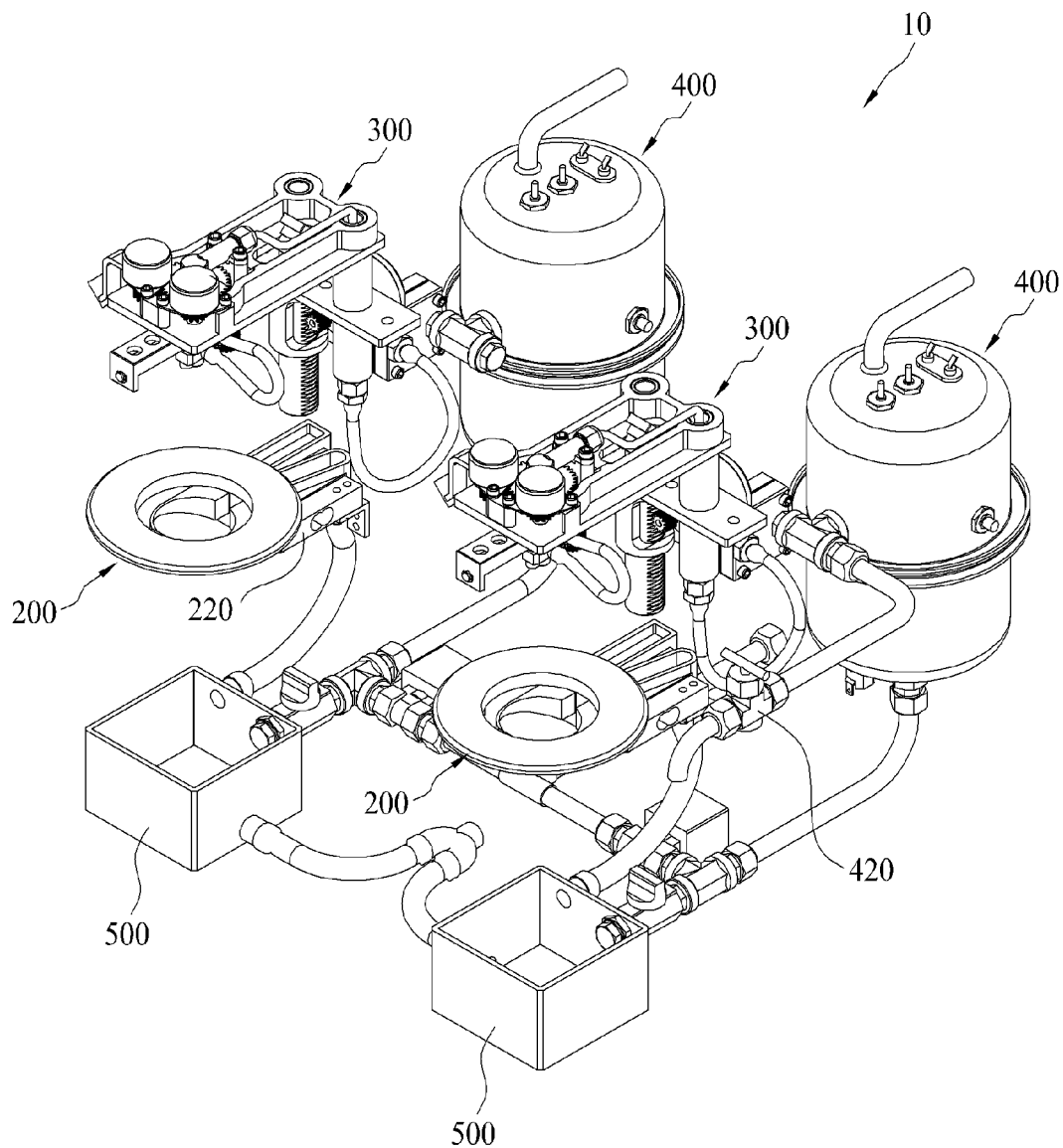
FIG. 2 is a perspective view of an auto coffee drip apparatus according to the present invention from which a housing is removed.

FIG. 1 is a perspective view of an auto coffee drip apparatus according to the present invention, and FIG. 2 is a perspective view of the auto coffee drip apparatus according to the present invention from which a housing is removed. An auto coffee drip apparatus 10 according to the present invention is an apparatus which automatically extracts coffee, by the use of a hand drip coffee extraction type in which a user extracts the extraction liquid of coffee using a kettle. As illustrated in FIGS. 1 and 2, such an auto coffee drip apparatus 10 largely includes a housing 100, a dripper tray module 200, a drip head module 300, a boiler module 400 and a drain water trench module 500.

As illustrated in FIG. 1, the housing 100 generally has a configuration that is similar to a housing 100 of a general espresso machine. The configuration of the housing 100 will be described in more detail with reference to FIG. 1.

The housing 100 is a device in which the dripper tray module 200, the drip head module 300, the boiler module 400 and the drain water trench module 500h are housed on internal and external one sides. The housing 100 generally has a hexahedral shape, and a support capable of seating the drip server 620 thereon is formed to protrude from a front lower one side. At this time, on the upper surface of the support, a drain hole 120 for collecting the extraction liquid and water ejected from a faucet 420 and the drip head module 300 is formed.

In addition, a control panel 110 is provided on one side of the housing 100 to control the auto coffee drip apparatus 10 and display the status of the auto coffee drip apparatus 10. The control panel 110 is connected to a control unit (not illustrated) for controlling the auto coffee drip apparatus 10, and enables a user to input. The control unit can control the auto coffee drip apparatus 10 in accordance with the user's input or information which has been input in the QR code 611 or bar code recognized by an image sensor 312 of the drip head module 300 to be described later, and can simultaneously display the current status and operational status of the auto coffee drip apparatus 10 on the control panel 110.

Figure 3:
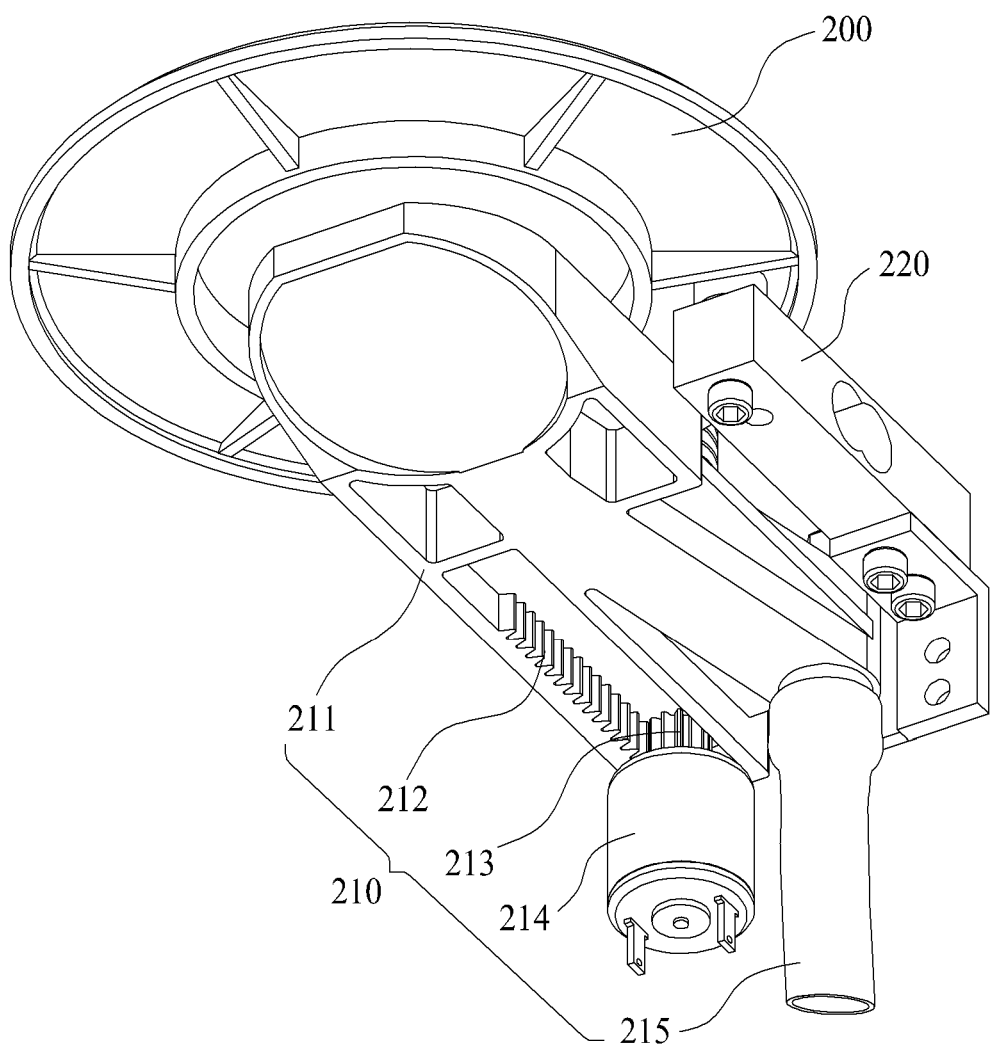
FIG. 3 is a bottom perspective view of a dripper tray module according to the present invention.

FIG. 3 is a bottom perspective view of the dripper tray module according to the present invention. The dripper tray module 200 provides a location on which a dripper 610, which stores the coffee powders or tea powders, is seated. The dripper tray module 200 is provided on one side of the front center of the housing 100. At this time, a plurality of the dripper tray modules 200 can be provided depending on the capacity, the size or the like of the auto coffee drip apparatus 10, and the dripper tray module is installed at a relatively higher position than the server 620 which stores the extraction liquid extracted from the dripper 610.

On one side of the dripper tray module 200, preferably on one side of the upper surface, a weight sensor 220 for measuring the weight of the dripper 610 to be seated is provided. The weight sensor 220 detects the weight of the coffee powders stored in the dripper 610, and measures a variation quantity of water flowing into the dripper 610 during the extraction and transmits the measurement to the control unit. At this time, data to be transmitted to the control unit is used to calculate the quantity of water required for extraction at the time of attachment of the dripper 610, and an average surface area for each weight of the grinding beans stacked on the dripper 610. Further, the data is used during extraction to calculate the point of time at which the extraction liquid first drops from the dripper 610, and a flow rate per unit time of the extraction liquid exiting from the dripper 610, and to calculate the extraction liquid collected in the server 620, by subtracting the quantity of water remaining in the dripper 610 from the quantity of water exiting from a metering pump 410 of the boiler module 400 through the control unit.

The dripper tray module 200 is provided with an openable waterspout 210. The openable waterspout 210 is intended to cause the extraction liquid to automatically flow into the drain water trench module 500 without flowing into the drip server 620 anymore, when the set quantity of the extraction liquid is extracted to the drip server 620.

The openable waterspout 210 is a device which moves to the lower part of the dripper tray module 200 and induces the extraction liquid extracted from the dripper 610 to the drain water trench module 500, when it is determined that the set volume of extraction liquid is extracted to the drip server 620 by the data of the weight sensor 220 received from the control unit.

As illustrated in FIGS. 2 and 3, such an openable waterspout 210 is configured to include a waterspout section 211, a second rack gear 212, a fourth pinion gear 213, a fourth motor 214 and a drain pipe 215.

The waterspout section 211 is a device which reciprocates through a linear motion between a position corresponding to the bottom of the dripper tray module 200, preferably, an extraction port of the dripper 610 seated on the dripper tray module 200, and a position that does not interfere with the extraction of the extraction liquid extracted from the extraction port of the dripper 610, and controls the flow of extraction of the extraction liquid. The waterspout section 211 is constituted by a flat plate member formed with predetermined depth of the grooves so as to be able to store and distribute a given quantity of extraction liquid.

The second rack gear 212 is formed on one side of the waterspout section 211 along the driving direction. At this time, although the second rack gear 212 may be formed in any direction, preferably, it is desirable to be formed in the forward and backward directions of the housing 100 so as to be able to drive the waterspout section 211 in the forward and backward directions of the housing 100.

The fourth pinion gear 213 is provided so as to mesh with the second rack gear 212. Further, the fourth pinion gear 213 is provided so as to be connected to the fourth motor 214 to transfer the rotary movement thereof to the second rack gear 212 in accordance with the rotation of the fourth motor 214 such that the waterspout section 211 provided in the second rack gear 212 linearly moves.

The drain pipe 215 is a device which is provided so as to connect one side of the waterspout section 211, preferably the groove formed in the waterspout section 211, and the drain water trench module 500, thereby allowing the extraction liquid flowing into the waterspout section 211 to flow to the drain water trench module 500.

At this time, as the fourth motor 214, it is desirable to use a motor capable of rotating in normal and reverse directions.

The driving status of the openable waterspout 210 having the above-described configuration will be described as follows.

When the fourth motor 214 rotates in one direction (counterclockwise direction), the fourth pinion gear 213 rotates in the same direction as the rotary direction of the fourth motor 214. When the fourth pinion gear 213 rotates, the waterspout section 211 advances through the second rack gear 212 meshed with the fourth pinion gear 213. Also, when the fourth motor 214 rotates in the other direction (clockwise direction), the fourth pinion gear 213 rotates in the same direction as the fourth motor 214 to drive the second rack gear 212 and reverse the waterspout section 211.

In this way, by performing the linear motion of the waterspout section 211 via the normal and reverse rotation of the fourth motor 214, the waterspout section 211 opens and closes the extraction port of the dripper 610. When the waterspout section 211 opens the extraction port of the dripper 610, the extraction liquid extracted from the dripper 610 flows into the drip server 620 seated on the lower part of the dripper tray module 200, and when the waterspout section 211 closes the extraction port of the dripper 610, the extraction liquid is induced so as to flow into the drain water trench module 500 via the drain pipe 215, without flowing into the drip server 620.

Figure 4:
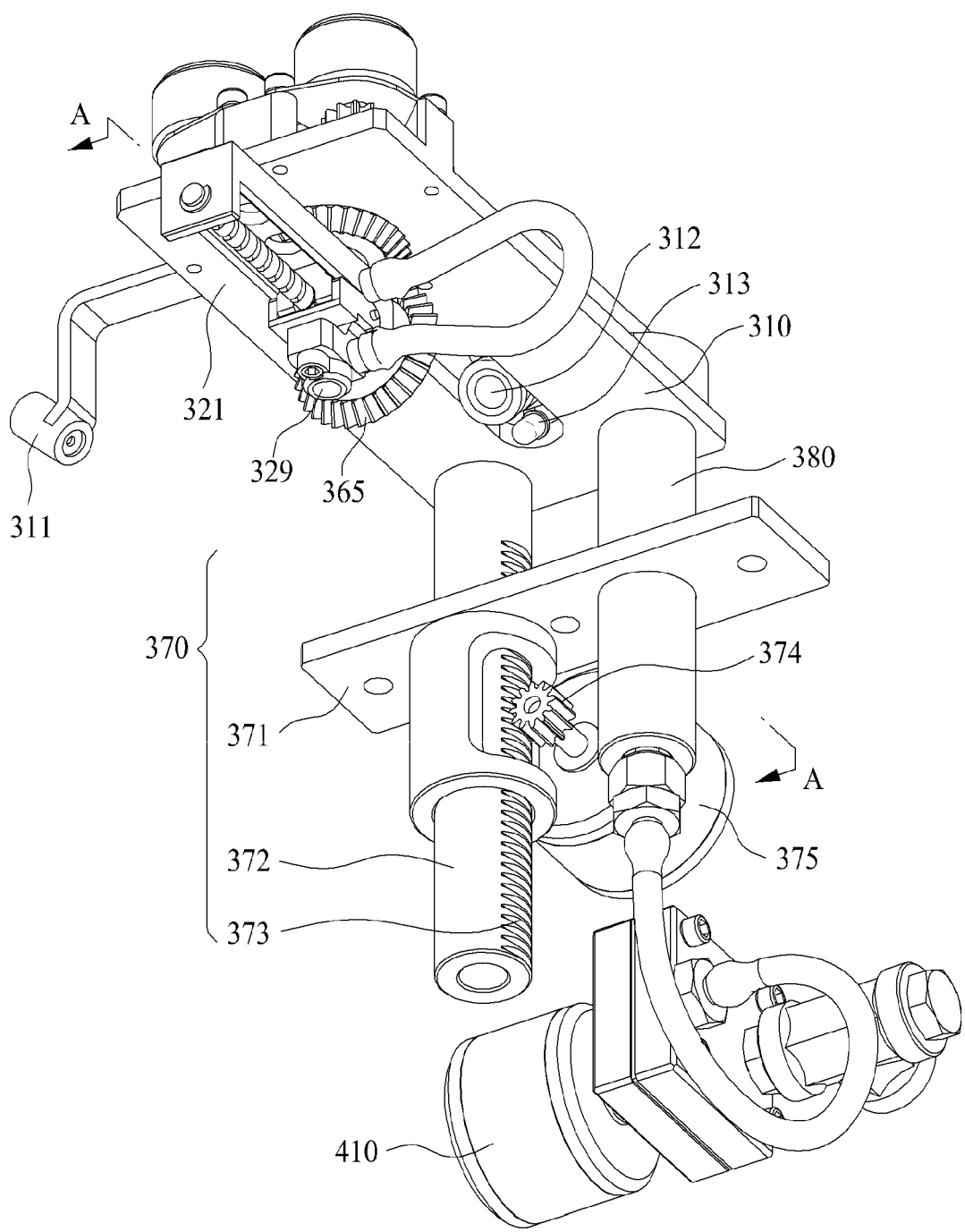
FIG. 4 is a perspective view of a drip head module according to the present invention.

FIG. 4 is a perspective view of the drip head module according to the present invention. As illustrated in FIGS. 1 and 2, the drip head module 300 is a device which is provided so as to be spaced from the upper part of the dripper tray module 200 at a predetermined interval and is seated on the dripper tray module 200 to inject the heated water to the dripper 610 which stores the coffee powders. The drip head module 300 is provided such that its height can be adjusted depending on the size of the dripper 610, the capacity of the coffee powders stored in the dripper 610 or the like, and is configured in a spirally rotatable manner so as to extract the extraction liquid of the coffee powders by the hand drip type.

As illustrated in FIG. 4, the drip head module 300 is generally configured to include a frame 310, a nozzle section 320, a rotary drive section 340, a lifting drive section 370, and a water transporting section 380.

The frame 310 protrudes to the forward outside of the housing 100, preferably, to the forward outside so as to correspond to the dripper tray module 200, thereby providing a space at which the devices constituting the drip head module 300, such as the nozzle section 320 and the rotary drive section, can be provided. Such a frame 310 generally has a flat plate shape of a rectangular parallelepiped shape, and is formed with a plurality of through-holes for smoothly coupling the rotary drive unit 340, the image sensor 312 and the lighting unit 313.

The nozzle section 320 is a device which is rotatably coupled to the frame 310 via the rotary drive unit 340, spirally rotates by the driving of the rotary drive unit 340, and injects the heated water supplied from the boiler module 400 to the dripper 610, while spirally driving the heated water, thereby extracting the extraction liquid by the extraction method similar to the hand drip extraction.

Here, although the nozzle section 320, the rotary drive unit 340 and the water transporting section 380 are separated into their constituents, respectively, since they are closely coupled to one another, the respective constituents will be simultaneously described without separation, regardless of the order.

Figure 5:
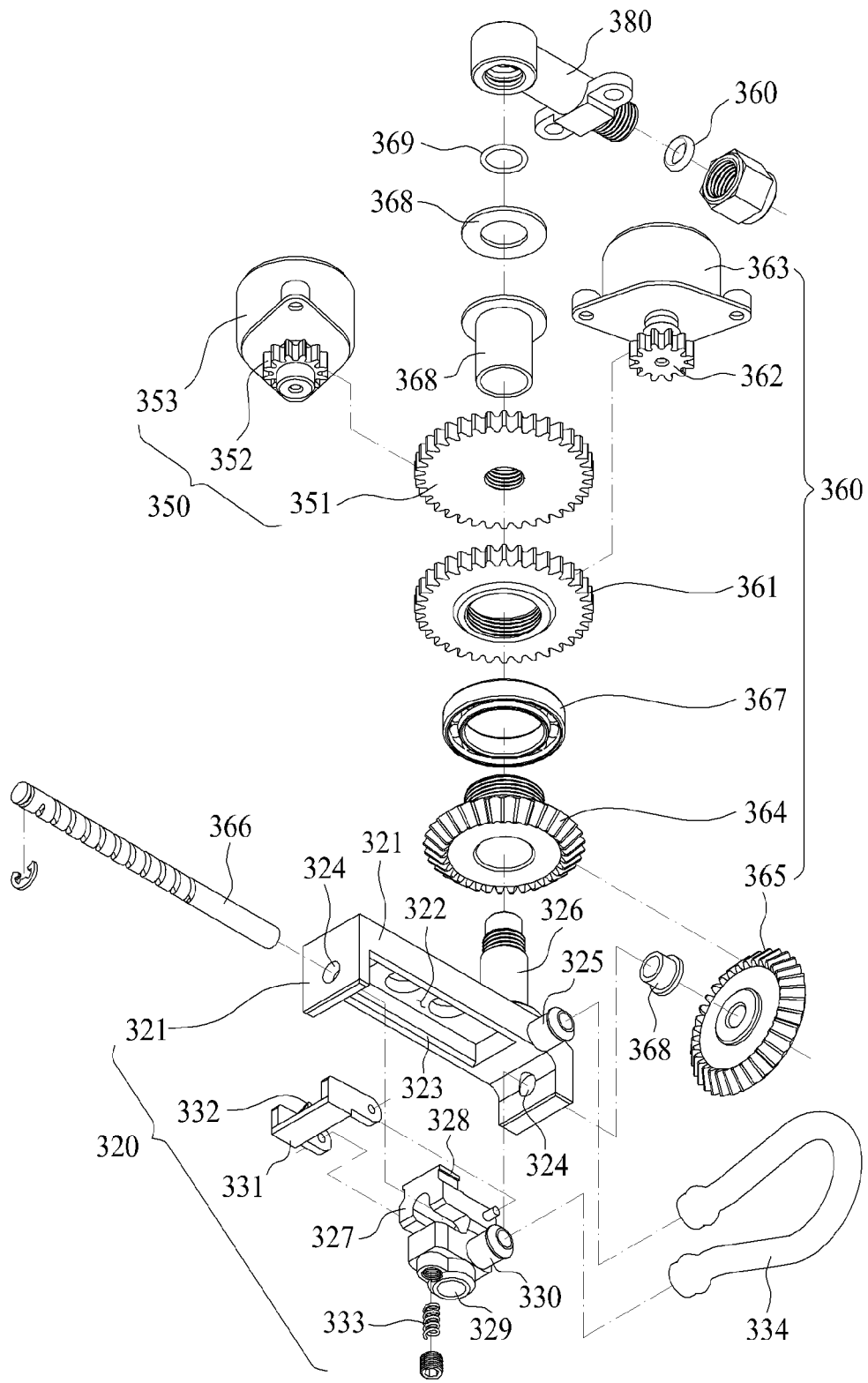
FIG. 5 is an exploded perspective view of a rotary drive unit according to the present invention.
Figure 6:
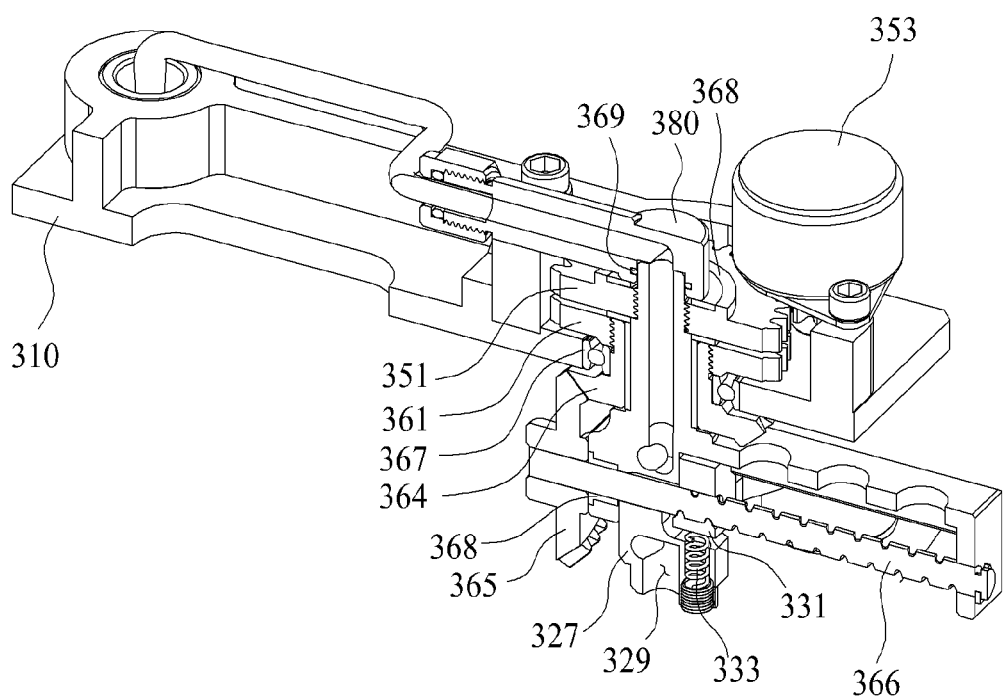
FIG. 6 is a cross-sectional view taken along a line A-A of FIG. 4.

FIG. 5 is an exploded perspective view of the rotary drive unit according to the present invention, and FIG. 6 is a cross-sectional view taken from a line A-A of FIG. 4. The water storing section is a device which is provided at the upper part of the frame 310 to induce the heated water, which is introduced from the boiler module 400 through a hose, a connection pipe or the like, to the nozzle section 320. The water storing section is a device which converts the movement path of the heated water such that the heated water introduced through the hose and the connection pipe can flow in the direction of gravity. In the drawings, although it has been illustrated so as to convert the movement path of the water using a rotary joint, as long as it is possible to achieve the above-described object, any device such as a bending pipe can be used.

The nozzle section 320 is a device which is provided so as to be connected to the water storing section, and spirally injects the water, which flows in from the water storing section, to the coffee powders stored in the dripper 610, thereby being able to extract the extraction liquid. The nozzle section 320 includes a main body 321, a connecting section 326, and a nozzle unit 327.

As illustrated in FIG. 5, the main body 321 generally has a rectangular parallelepiped shape a cross section of which is rectangle. An insertion groove 322 is formed on a lower surface of the main body 321, such that the nozzle unit 327 is inserted and can linearly move along the lengthwise direction. At this time, on both side wall surfaces of the insertion groove 322 in the lengthwise direction, a guide rail 323 for guiding the nozzle unit 327 to be moved stably and linearly motion is formed. As illustrated in FIG. 5, the guide rail 323 can be formed by a long groove formed longer in the lengthwise direction of the insertion groove 322, and another member such as a rail member 323 can be provided.

Further, at both terminal ends in the lengthwise direction of the main body 321, a partition wall projecting downward is formed, and through-holes 324 are formed in the partition wall at positions corresponding to each other such that the lead screw 366 can pass through, respectively. At this time, although the partition wall and the through-hole 324 may not be formed, it is desirable that the partition wall and the through-hole 324 be formed for the stable support of the lead screw 366.

The connecting section 326 is provided on the upper one side of the main body 321, and preferably, on anyone side of both terminal end portions in the lengthwise direction. The connecting section 326 is a device that provides a passage through which the water flowing from the water storing section can flow, and at the same time, performs the role of the rotary axis during rotation of the nozzle section 320. The connecting section 326 has a hollow tubular shape for water flow, as described above, and preferably, has a circular tubular shape so as to smoothly perform the role of the rotation center axis.

An O-ring 369 is inserted in a coupling section between the connecting section 326 and the water storing section to prevent leakage of flowing water.

At one terminal end portion of the main body 321 formed with the connecting section 326, a first hose connecting section 325 protruding to a lateral surface is provided at the position corresponding to the connecting section 326. When the water introduced through the connecting section 326 is directly discharged downwards, since the water supply to the nozzle unit 327 moving along the groove of the main body 321 is not easily performed, water is induced to the first hose connecting section 325 side to cause the water to flow into the nozzle unit 327 through the hose 334. At this time, it is obvious that one side of the main body 321, to which the connecting section 326 and the first hose connecting section 325 are connected, is penetrated to allow the flow of water.

The nozzle unit 327 is a device which is inserted into the insertion groove 322 of the main body 321 and linearly moves along the lengthwise direction of the insertion groove 322 in accordance with the driving of the lead screw 366 of a second rotary drive unit 360, which will be described later, to inject water into the dripper 610.

The nozzle unit 327 is a device which is inserted into the insertion groove 322 of the main body 321 to be moved in a sliding manner along the lengthwise direction of the main body 321 and to inject the water, which flows in by sequentially flowing through the connecting section 326, the interior of the main body 321, the first hose connecting section 325 and the hose 334, to the dripper 610 in the direction of gravity.

The nozzle unit 327 generally has a rectangular parallelepiped shape, and a hollow section is formed at the inside lower part to be bent downward and laterally, through which water can flow. At this time, the hollow section formed in the lower part becomes the nozzle 329 which finally injects water to the outside. Further, a second hose connecting section 330 is provided so as to extend to the outside of the hollow section formed in the lateral surface, and the second hose connecting section 330 is connected to the first hose connecting section 325 through the hose 334 such that the water discharged from the connecting section 326 of the main body 321 flows into the nozzle unit 327. Therefore, the second hose connecting section 330 is preferably provided to protrude to the same side as the first hose connecting section 325.

Since the nozzle unit 327 reciprocates along the lengthwise direction of the main body 321, the hose 334 which connects the first hose connecting section 325 and the second hose connecting section 330 has a sufficient length, and is preferably made of a flexible material.

At the upper end portion of the nozzle unit 327, a protrusion 328 corresponding to the guide rail 323 of the main body 321 is formed. The protrusion 328 has a shape corresponding to the guide rail 323, couples the nozzle unit 327 to the main body 321, and at the same time enables the nozzle unit 327 to stably perform the linear reciprocating motion along the guide rail 323 formed along the lengthwise direction of the main body 321.

On one side of the nozzle unit 327, and preferably, at the position corresponding to the through-holes 324 formed on both side wall surfaces in the lengthwise direction of the main body 321, a through-hole is formed. The through-hole formed in the nozzle unit 327 is to provide a space through which the lead screw 366 can penetrate similarly to the through-hole 324 of the main body 321.

Also, on one side of the nozzle unit 327, and preferably, at the lower part of the through-hole through which the lead screw 366 penetrates, a coupling groove corresponding to the movement path of the nozzle section 327 is formed. The coupling groove can have a thickness which enables a flat plate-shaped nozzle fixing section 331, which will be described later, to be inserted. Moreover, on one side of the nozzle unit 327 adjacent to the coupling groove, a coupling protrusion for securing the nozzle fixing section 331 to be coupled is formed.

The nozzle fixing section 331 is a device which is inserted into the coupling groove of the nozzle unit 327 to drive the nozzle unit 327 in accordance with the driving of the lead screw 366. The nozzle fixing section 331 generally has a flat plate shape and is inserted into the coupling groove of the nozzle unit 327, and at one side, a coupling hole corresponding to the coupling protrusion provided in the nozzle unit 327 is formed and thus, the nozzle fixing section 331 is stably fixed to the nozzle unit 327 therethrough. At this time, on one surface of the nozzle fixing section 331, a projection 332 corresponding to the screw thread of the lead screw 366 is formed to protrude. In this way, the projection 332 formed to protrude is coupled so as to be inserted into the screw thread of the lead screw 366, which makes it possible to linearly move the nozzle unit 327 in accordance with the rotational force of the lead screw 366.

In the present invention, although the description is made on the basis of the status in which the nozzle unit is coupled with the lead screw 366 through the nozzle fixing section 331, a projection 332 corresponding to the screw thread of the lead screw 366 may be formed to protrude from one side of the nozzle unit 327 so as to be directly connected to the lead screw 366, without having the nozzle fixing section 331.

The nozzle unit 327 can be provided with an elastic unit 333. The elastic unit 333 is a device which is inserted into the through-hole or the groove formed in the lower part of the coupling groove to elastically support the nozzle fixing section 331 in the direction of the lead screw 366 and to bring the nozzle fixing section 331 into close contact with the lead screw 366. The drawings illustrate that the through-hole is formed, and after inserting the elastic unit 333 such as a coil spring therein, the through-hole is closed by a pupae screw. However, this merely illustrates an example, it is also possible to insert the elastic unit 333 into the groove instead of the through-hole, and in another example, it is also possible to elastically support the nozzle fixing section 331, by inserting the elastic unit, such as a leaf spring between the nozzle fixing section 331 and the insertion groove 333, without forming the through-hole the groove. In this way, the use and the coupling method of the elastic unit 333 may be variously and selectively used by the user's selection.

Next, the configuration of the rotary drive unit 340 which transmits power for rotating the main body 321 of the nozzle section 320 and for linearly moving the nozzle unit 327 will be described.

First, the first rotary drive unit 350 for rotating the main body 321 of the nozzle section 320 will be described as follows.

As illustrated in FIG. 5, the first rotary drive unit 350 is generally constituted by a first spur gear 351, a first pinion gear 352 and a first motor 353.

The first spur gear 351 is formed with gear teeth on an outer circumferential surface, and screw threads on an inner circumferential surface. At this time, on one side of the outer circumferential surface of the connecting section 326 of the nozzle unit 327, screw threads corresponding to the screw threads formed on the inner circumferential surface of the first spur gear 351 are formed, and the first spur gear 351 is coupled to the connecting section 326 and to rotate around the center axis of the connecting section 326 as the rotation center axis. At this time, in order to prevent the first spur gear 351 from being arbitrarily separated from the connecting section 326 due to the rotation of the first spur gear 351, a bush 368 is provided on the upper surface and the lower surface of the first spur gear 351.

The bush 368 provided on the upper surface of the first spur gear 351 prevents the first spur gear 351 or the water storing section from being worn by friction due to the direct contact between the water storing section and the upper surface of the first spur gear 351, and at the same time, prevents the separation of the first spur gear 351 and the connecting section 326 which are coupled to each other by the screw threads formed on the inner circumferential surface of the first spur gear 351 and the screw threads formed on the outer circumferential surface of the connecting section 326.

In order to prevent the separation of the first spur gear 351 and the connecting section 326, and at the same time, to allow a second spur gear 361 of the second rotary drive unit 360, which will be described later, to rotate independently from the rotation of the connecting section 326, the bush 368 provided on the lower surface of the first spur gear 351 is provided in a form which corresponds to the outer circumferential surface of the connecting section 326 or on which a pipe-shaped extension having a relatively large diameter is formed to protrude downward.

In the above description, although the description has been made on the basis of the fact that the first spur gear 351 and the connecting section 326 are coupled to each other by the screw threads, since the connecting section 326 rotates together with the first spur gear 351, the first spur gear 351 and the connecting section 326 may be coupled by welding, the fixing pin or the like.

The first pinion gear 352 is provided to have the gear teeth corresponding to the gear teeth of the first spur gear 351 and is provided such that the respective gear teeth mesh with one another.

The first motor 353 is coupled to the first pinion gear 352 such that the power transmission shaft is the rotation center axis of the first pinion gear 352. At this time, as the first motor 353, it is possible to use all the motor capable of rotating only in one direction or the motor capable of rotating in the normal and reverse directions depending on the usage aspect. The reason is that, since the extraction liquid of the coffee in hand drip type is extracted generally while rotating only in one direction, it is possible to fully perform its role only by the rotation in one direction.

The power transmission order of the first rotary drive unit 350 having the above-described configuration will be described in more detail as follows.

First, the first motor 353 rotates the first pinion gear 352 connected to the power transmission shaft in one direction. In this way, when rotating the first pinion gear 352, the first spur gear 351, the gear teeth of which mesh with the former, rotates together by the rotation of the first pinion gear 352.

Next, by the rotation of the connecting section 326 connected to the first spur gear 351, the main body 321 of the nozzle section 320 is finally rotated in the same direction as the first spur gear 351.

The second rotary drive unit 360 for linearly moving the nozzle unit 327 of the nozzle section 320 will be described as follows. Here, although the second rotary drive unit 360 linearly moves the nozzle unit 327, since it finally spirally rotates the nozzle section 320 together with the first rotary drive unit 350, it will be referred to as a rotary drive unit.

As illustrated in FIGS. 5 and 6, the second rotary drive unit 360 is configured to include a second spur gear 361, a second pinion gear 362, a second motor 363, a first bevel gear 364, a second bevel gear 365 and a lead screw 366.

The second spur gear 361 is coupled to the outside of the connecting section 326 so as to set the central axis of the connecting section 326 of the nozzle section 320 as the rotation center axis, similarly to the first spur gear 351. However, since the second spur gear 361 needs to rotate independently from the rotation of the connecting section 326, it is provided so as to surround the outer circumferential surface of the extension of the bush 368 which is provided to be in contact with the lower surface of the first spur gear 351 as described above. At this time, the screw threads for being coupled with the first bevel gear 364 is formed on the inner circumferential surface of the second spur gear 361, and the gear teeth are formed on the outer circumferential surface thereof.

The second pinion gear 362 is formed with the gear teeth corresponding to those of the spur gear 351 and is coupled such that the respective gear teeth mesh with one another.

The second motor 363 is coupled to the second pinion gear 362 such that the power transmission shaft becomes the rotation center axis of the second pinion gear 362. At this time, as the second motor 363, it is desirable to use the motor capable of rotating in the normal and reverse directions. The reason is that, since the forward or backward direction of the nozzle unit 327 is determined depending on the direction of rotation of the lead screw 366 that finally receives the power transmission, the motor is used which is capable of rotating in the normal and reverse directions such that the nozzle unit 327 is capable of performing both the forward and backward movements.

The first bevel gear 364 is coupled with the second spur gear 361 and is provided so as to rotate with the same rotary axis as the first spur gear 351. At this time, at the coupling section of the first bevel gear 364, screw threads corresponding to the screw threads formed on the inner circumferential surface of the second spur gear 361 are formed, and the first bevel gear 364 and the second spur gear 361 are coupled to each other through the respective screw threads. The first bevel gear 364 I is also provided so as to surround the outer circumferential surface of the extension of the bush 368 provided at the lower part of the first spur gear 351.

As long as the first bevel gear 364 can be coupled so as to rotate together by the rotation of the second spur gear 361, it may be coupled via any coupling method, such as welding or the coupling pin, in addition to the coupling by the screw threads.

A bearing 367 can be further provided between the second spur gear 361 and the first bevel gear 364, so as to prevent the separation of the second spur gear 361 and the first bevel gear 364 and prevent the frame 310 and the first bevel gear 364 from being worn due to the contact between the frame 310 and the first bevel gear 364. Presence or absence of the bearing 367 can be selectively used, depending on the coupling position of the first rotary drive unit 350 and the second rotary drive unit 360.

The second bevel gear 365 is a device that rotates around the lead screw 366 coupled to the through-hole 324 of the main body 321 of the nozzle section 320 as the rotation center axis and transmits the power of the first bevel gear 364 to the lead screw 366. The second bevel gear 365 has gear teeth corresponding to those of the first bevel gear 364, and is provided so as to form a predetermined angle with the first bevel gear 364 such that the lead screw 366 can be provided in parallel with the main body 321 of the nozzle section 320.

The lead screw 366 is provided to sequentially penetrate through the center axis of the second bevel gear 365, the through-hole 324 formed at one end of the main body 321 of the nozzle section 320, the nozzle unit 327, and the through-hole 324 formed at the other end of the main body 321 of the nozzle section 320. At this time, the second bevel gear 365 and the lead screw 366 are provided so as to be fixed through a screw or welding such that the lead screw 366 can rotate in response to rotation of the second bevel gear 365, and the other end of the lead screw 366 is fixed through the snap ring such that it cannot be separated.

Also, at a part of the lead screw 366, and preferably, at a part of the lead screw 366 corresponding to the length of the insertion groove 322 formed on the main body 321 of the nozzle section 320, a spiral groove is formed on the outer circumferential surface along the lengthwise direction of the lead screw 366. This is for inserting the projection 332 of the nozzle fixing section 331 described above such that the protrusion 332 moves forward or backward along the spiral groove in accordance with the rotation of the lead screw 366.

At this time, it is desirable that the bush 368 be provided between the second bevel gear 365 and the main body 321 of the nozzle section 320.

The drip head module 300 having the above-described configuration may further include a cover for surrounding the respective components to prevent external foreign matter from flowing in.

The lifting drive unit 370 is a device which raises or lowers the drip head module 300 and adjusts the distance between the drip head module and the dripper 610, preferably, the upper surface of coffee powder stored in the dripper 610, thereby adjusting the height of the water injected from the nozzle section 320. As the lifting drive unit 370, as long as it is possible to raise or lower the drip head module 300, a device having any form and configuration may be used, but as illustrated in FIGS. 2 and 4, it is preferably constituted by the fixing frame 371, the support column 372, the third pinion gear 374 and the third motor 375.

The fixing frame 371 is a device which is provided so as to be fixed to one side of the housing 100, preferably, to the front portion of the upper end surface of the housing 100, and provides a base on which the lifting means can receive force when drip head module 300 is raised or lowered. The fixing frame 371 generally has a flat plate shape, and is formed with a penetration into which the support column 372 can be inserted. In the penetration into which the support column 372 is inserted, a columnar hollow extension is formed which has an inner diameter corresponding to the diameter of the support column 372 at the upper part or the lower part, and one side of which is open. The columnar extension is intended to suppress the shaking of the support column 372 during raising or lowering of the support column 372, thereby securing the stable raising or lowering of the support column 372 to minimize the shaking of the support column 372 during raising or lowering of the drip head module 300.

Also, a penetration is formed on one side of the fixing frame 371, and the water transporting section 380, such as a pipe and a hose for transporting the water from the boiler module 400 to the nozzle section 320 is inserted into the penetration. Although the penetration, into which the water transporting section 380 is inserted, may not be formed, the penetration is desirable to be formed to simplify the configuration of the apparatus.

The support column 372 is provided on one side of the frame 310, preferably, at the other end portion of the frame 310 in which the nozzle section 320 is provided. The support column 372 is formed to be vertically longer, and a first rack gear 373 is formed along the lengthwise direction. At this time, the first rack gear 373 can be entirely formed or can be partially formed along the lengthwise direction of the support column 372, depending on the usage aspect.

The support column 372 is inserted into the penetration and the extension of the fixing frame 371 such that a portion formed with the first rack gear 373 is positioned on the open one side of the extension of the fixing frame 371.

The third pinion gear 374 is provided to have gear teeth corresponding to the gear teeth of the first rack gear 373, is coupled to the power transmission shaft of the third motor 375, rotates around the power transmission shaft of the third motor 375 as a rotary shaft, and transmits the power of the third motor 375 to the first rack gear 373.

The third motor 375 is a device which generates power for driving the pinion gear 374, and it is preferable to use a motor capable of rotating in the normal and reverse directions for raising or lowering the drip head module 300.

The laser module 311 is a device which is provided on one side of the frame 310 to measure the distance between the drip head module 300 and the surface of the grinding beans stored in the dripper 610. In this way, the distance between the drip head module 300 and the surface of the grinding beans measured through the laser module 311 is transmitted to the control unit, and the control unit controls the lifting drive unit 370 based on this data to raise and lower the drip head module 300 for extracting the extraction liquid to the optimal height.

The image sensor 312 is preferably installed so as to detect the dripper 610 seated on the dripper tray module 200 on the lower one side of the frame 310. The image sensor 312 directly measures the color and grindability of the grinding beans stored in the dripper 610, the surface area of the surface of the grinding beans, and the distance between the drip head group and surface of the grinding beans, or collects the image data for reading the bar code or the QR code 611 provided on one side of the dripper 610. At this time, the information about beans and the drip information according to the beans are input in the bar code or the QR code 611, and the control unit automatically controls the auto coffee drip apparatus 10 based on the bean information and the drip information.

The lighting unit 313 is a device which is provided on one side of the frame 310 adjacent to the image sensor 312 to provide lighting such that the image sensor 312 can more easily collect the image data. Although any kind of lighting devices may be used as long as it is possible to achieve this object, preferably, it is desirable to use an LED lighting.

Figure 7:
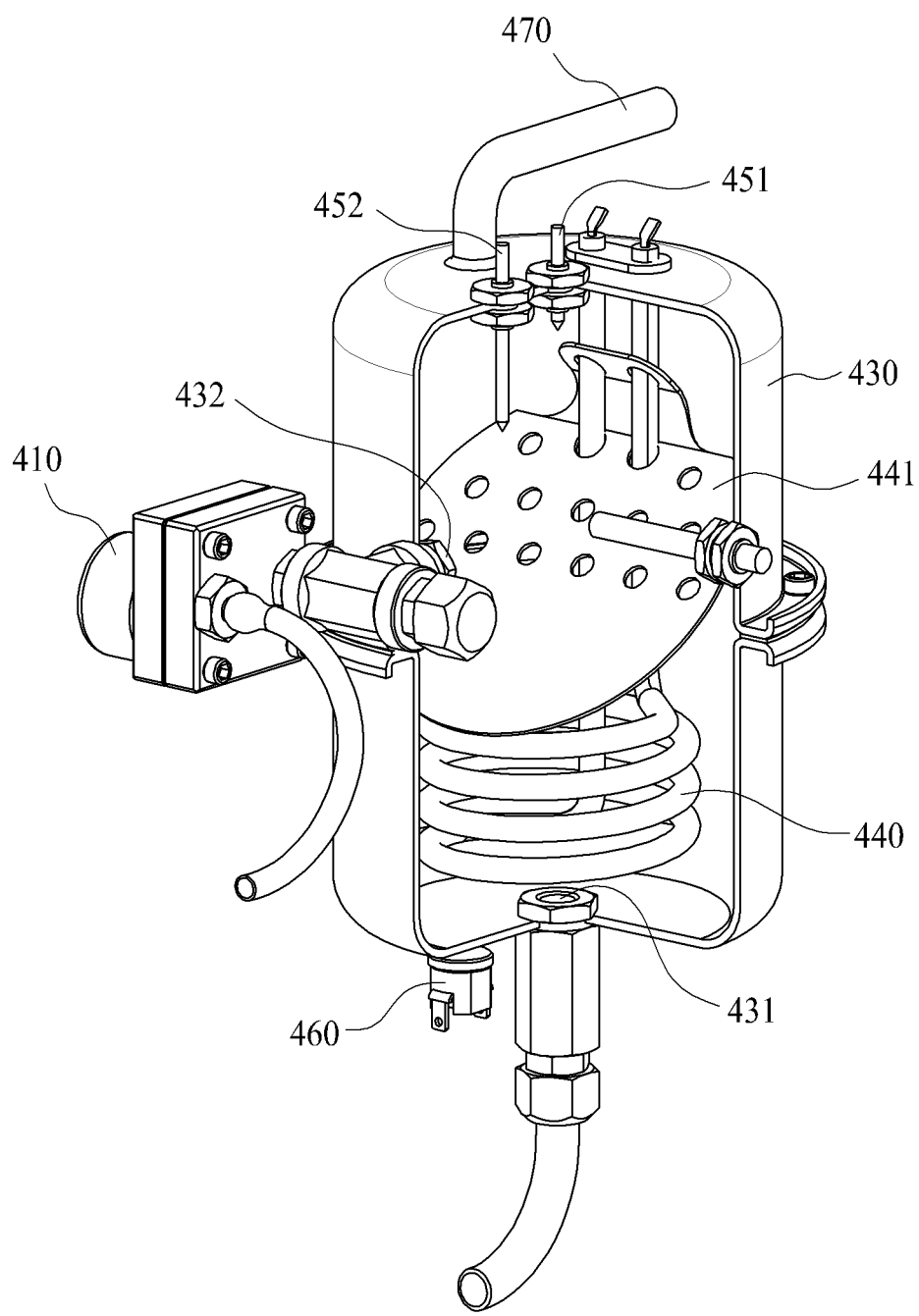
FIG. 7 is a partial cross-sectional view of a boiler module according to the present invention.

FIG. 7 is a partial cross-sectional view of a boiler module according to the present invention. The boiler module 400 is a device which generates and supplies the heated water for extracting the coffee and obtaining the extraction liquid. The module has the configuration similar to the boiler module 400 which is commonly used in an espresso machine in the art. The boiler module 400 will be described in more detail as follows.

As illustrated in FIG. 7, the boiler module 400 includes a case 430, a water inlet 431, a water outlet 432, a heater, a convection plate 441, an upper limit water level sensor 451, a lower limit water level sensor 452, a temperature switch 460 and an air passage 470.

The case 430 is a device that stores a given quantity of water and provides a location where water is heated. The shape and capacity of the case 430 can be variously formed depending on the shape and the capacity of the auto coffee drip apparatus 10.

The water inlet 431 is a device which is formed on one side of the case 430 and provides a passage into which the water for heating can flow. The water inlet 431 is preferably connected to a water purifier to allow the purified water to flow in, likewise the boiler module 400 of the espresso machine, and a solenoid valve for controlling the flow of water flowing into the case 430 may be provided on one side of the connecting line connected to the water purifier.

The water outlet 432 is intended to discharge the heated water from the case 430 and is connected to the water transporting section 380. A metering pump 410 is provided on one side of the water transporting section 380 to control the flow velocity and the flow rate of the heated water which is supplied to the drip head module 300. Since the number of revolution of the metering pump is proportional to the discharge quantity of water, the metering pump 410 can stably control the flow velocity and the flow rate of the water.

The heater 440 is a device which is provided inside the case 430 to heat the water stored inside the case 430. The heater 440 is driven and stopped by the temperature switch 460 and the temperature sensor. Since the heater 440 is commonly used in the art, the detailed description thereof will be omitted.

The convection plate 441 is provided on one side of the heater 440 to prevent the convective heat generated from the heater 440 from directly touching the water outlet 432 and the temperature sensor and limit the direction of convection.

The upper limit water level sensor is intended to limit the maximum water level within the case 430 by blocking the solenoid valve, and the lower limit water level sensor opens the solenoid valve so as to limit the lowest water level of the water stored within the case 430. The control of the solenoid valve is performed such that the control unit receives the data of the upper limit water level sensor and the lower limit water level sensor, and the control unit automatically controls the solenoid valve based on the respective data.

The air passage 470 is a device which is provided at the upper one side of the case 430, preferably, at a position relatively higher than the highest water level point of the case 430, eliminates a difference between the internal and external pressures of the case 430 due to inflow and outflow of water, and discharges the steam generated by heating the water.

The boiler module 400 can further include a discharge line which is connected to a faucet 420 provided on the outer surface of the housing 100, in addition to the line which is discharged to the drip head module 300. Thus, by further including the faucet 420, the additionally heated water can be supplied to the user in addition to the heat used for the extraction of the coffee. Since the faucet 420 has the same configuration as the espresso machine, the detailed description thereof will be omitted.

The drain water trench module 500 is a device which is provided on the lower one side of the housing 100, preferably, on one side at which the drip server 620 is provided below the dripper tray module 200 to prevent the water or extraction liquid arbitrarily discharged from the drip head module 300 or the faucet 420 from being leaked out of the housing 100. The drain water trench module 500 is a device which is connected to the drain hole 120 of the housing 100 and the drain pipe 215 of the openable waterspout 210 to store the water or the extraction liquid discharged therethrough and discharge the water or the extraction liquid to the outside. Since the drain water trench module 500 also has the configuration similar to the drain water trench module 500 of the espresso machine, the detailed description thereof will be omitted.

Use Aspect of Auto Coffee Drip Apparatus

The use aspect of the auto coffee drip apparatus 10 having the above-mentioned configuration will be described as follows.

First, power is applied to the auto coffee drip apparatus 10.

Next, when the power is applied the auto coffee drip apparatus 10, the water flows into the boiler module 400 connected to the water purifier. The water flowing into the boiler module 400 continuously flows in until it is detected by the upper water level sensor 451, and when the water flows into the upper limit water level sensor 451, the upper limit water level sensor 451 sends a signal to the control unit, and the control unit controls the solenoid valve to shut off the inflow of water.

Next, the boiler module 400 heats the water to a temperature which is set by the control unit. Although the temperature of water used for extraction varies depending on the type of beans, the roasting degree or the like, in order to heat the water during extraction and minimize the temperature control of the heated water, the boiler module 400 maintains a status of heating the water introduced inside to the reference temperature.

Figure 8:
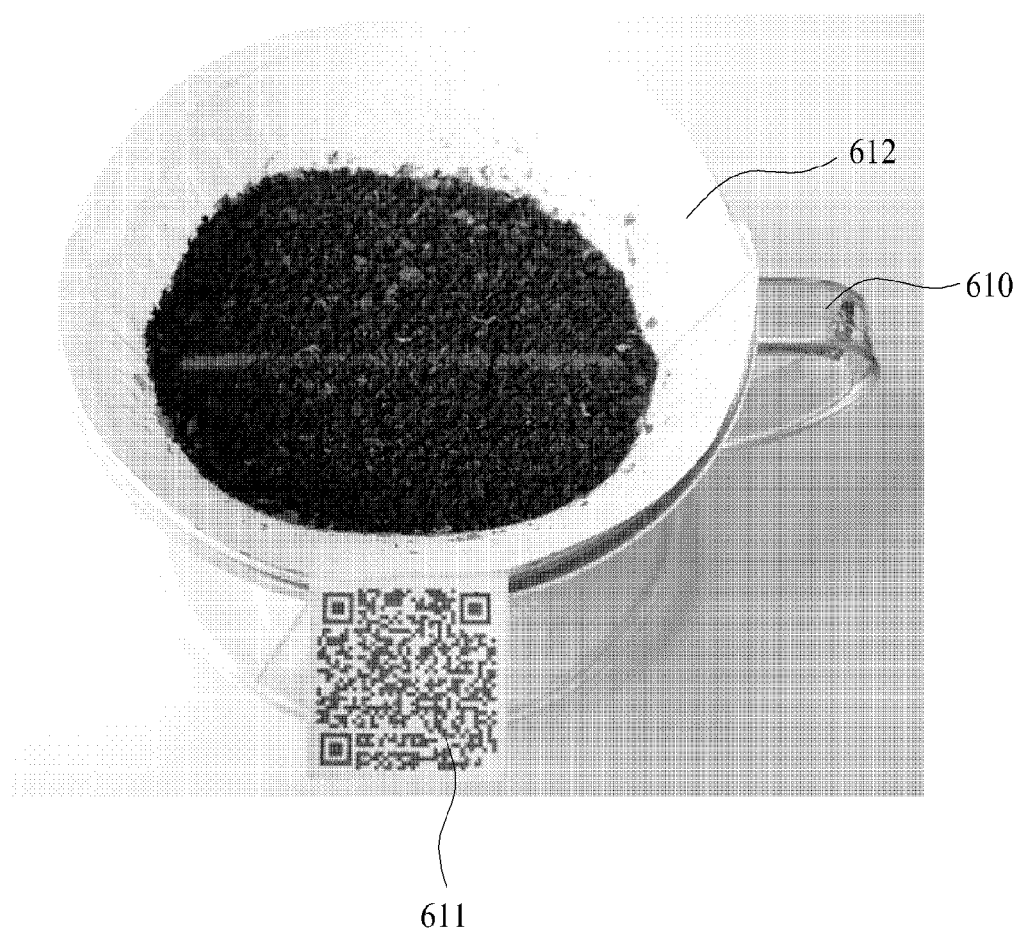
FIG. 8 is a perspective view of a dripper which stores coffee powders.

FIG. 8 is a perspective view of a dripper which stores the coffee powders. Next, as illustrated in FIG. 8, the grinding beans are put in the dripper 610 and are seated on the dripper tray module 200. The grinding particle size of the grinding beans stored in the dripper 610 can be variously adjusted, depending on the type of beans, the degree of roasting, and the taster's preference. Further, the capacity of beans stored in the dripper 610 can also be variously selected, depending on the quantity of the extraction liquid to be extracted and the taster's preference.

Next, the auto coffee drip apparatus 10 is set. A method for setting the auto coffee drip apparatus 10 can be generally classified into two methods. One method is a way for using the QR code 611 or bar code in which the bean information and the drip information are input, and the other method is a way in which a user directly sets the apparatus using the control panel 110.

First, the method for using the QR code 611 or the bar code will be described as follows.

In the QR code 611 or the bar code, the type of beans, the degree of roasting and the grinding particle size that are used for the extraction according to the user's preferences and the capacity of extraction liquid, the capacity of the beans and the extraction liquid, the bean information, and the control information of the auto coffee drip apparatus 10 based on the bean information are input. The QR code 611 and the bar code can be attached to one side of the dripper 610, and when the bean information and the control information are changed, the corresponding QR code 611 and the bar code can be changed and attached.

The QR code 611 or the bar code attached to the dripper 610 is recognized by the image sensor 312 provided in the frame 310 of the drip head module 300, the information is sent to the control unit, and the input of setting information of the auto coffee drip apparatus 10 is completed.

A method for inputting the setting information of the auto coffee drip apparatus 10 using the control panel 110 will be described as follows.

A user can input the type of beans, the degree of roasting, the grinding particle size, the capacity of beans and extraction liquid or the like into the control panel 110, or can directly input the setting information of the auto coffee drip apparatus 10 to the control unit, by inputting the temperature of water, the capacity of extraction liquid, the driving speed and position of the drip head module 300 or the like.

As described above, when the setting information is input to the control unit by selecting one of the two methods, the auto coffee drip apparatus 10 prepares the extraction of coffee by the following processes.

In the boiler module 400, the water temperature is changed to the temperature which is optimized for the beans. If the reference temperature of the water stored in the heated status in the boiler modules 400 is lower than the temperature for extraction, the temperature of the boiler module 400 is set to be more higher, and if the temperature for extraction is lower than the reference temperature of water, the operation of the heater 440 is stopped to lower the temperature of the water.

At the same time, the lifting drive unit 370 of the drip head module 300 adjusts the lifting height of the drip head module 300 in accordance with the control of the control unit. Since the distance between the drip head module 300 and the surface of beans varies depending on the capacity of the grinding beans stored in the dripper 610, height of the drip head module 300 is adjusted to the optimum height for the drip.

When the control unit sets the distance between the drip head module 300 and the surface of the grinding beans stored in the dripper 610, the laser module 311 provided one side of the drip head module 300 measures the distance between the surface of the grinding beans and the nozzle 329 and adjusts the height of the drip head module 300 to the position that is set by the control unit.

Figure 9:
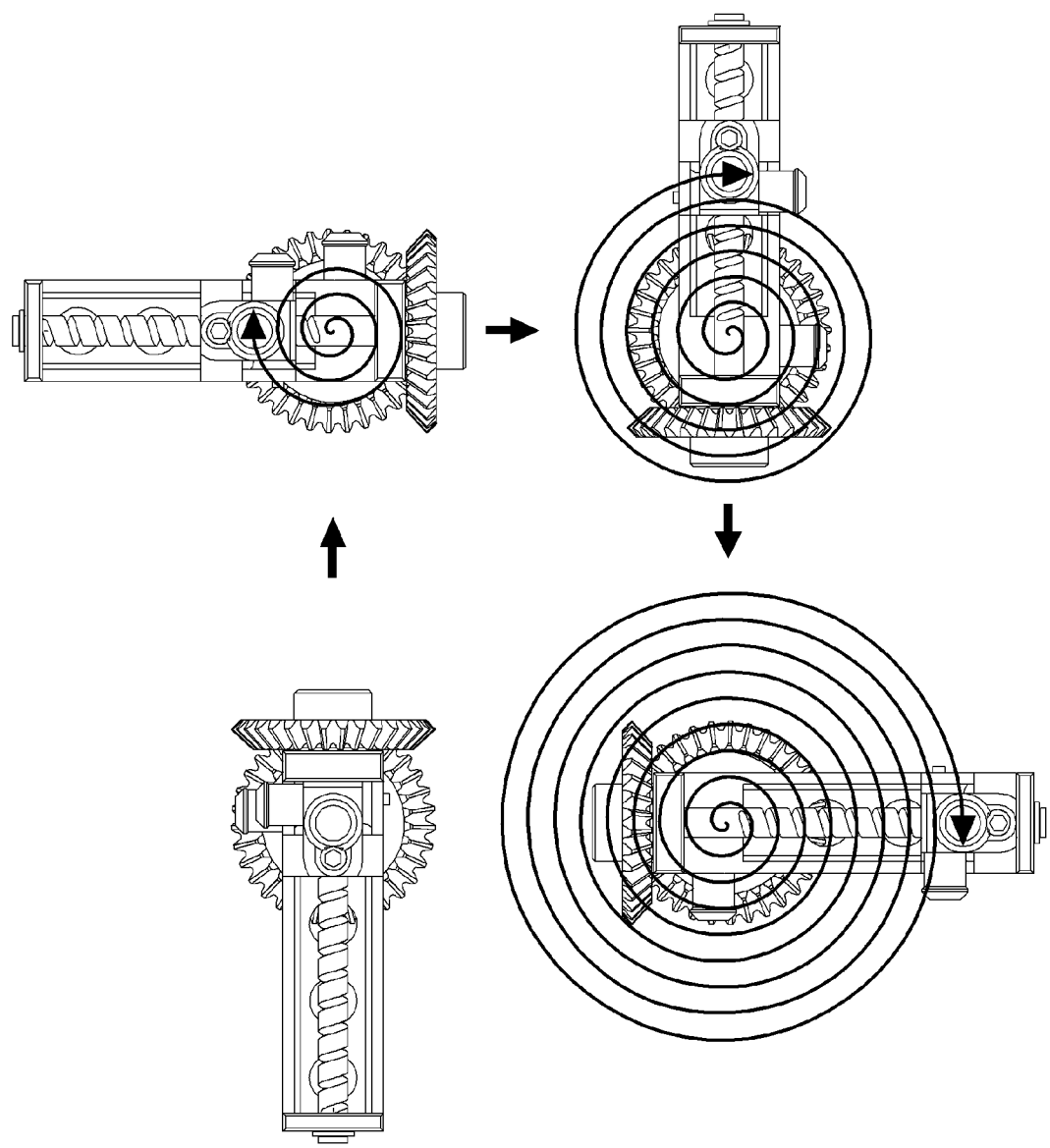
FIG. 9 is a bottom view illustrating a rotation status of the drip head module according to the present invention; and FIG. 10

FIG. 9 is a bottom view illustrating the rotation status of the drip head module according to the present invention. When the drip head module 300 is set at a position that is suitable for injecting the water, the water is injected to the grinding beans stored in the dripper 610 from the nozzle section 320 of the drip head module 300. At this time, as illustrated in FIG. 9, water is injected so as to draw a circle which is gradually expanded from the center. That is, water is spirally injected. In this way, the driving of rotary drive unit 340 of the drip head module 300 for spirally injecting the water will be described in more detail as follows.

When driving only the second rotary drive unit 360, the main body 321 of the nozzle section 320 is fixed without rotation, and only the nozzle unit 327 performs the linear motion along the lengthwise direction of the main body 321.

When driving only the first rotary drive unit 350, the second bevel gear 365 rotates together by the rotating reaction while the main body 321 of the nozzle section 320 rotates, and the nozzle section 372 draws the spiral like FIG. 9 while advancing along the insertion groove 322 of the main body 321.

Therefore, in order to spirally inject the water, it is necessary to drive only the first rotary drive unit 350, and or simultaneously drive the first rotary drive unit 350 and the second rotary drive unit 360. Preferably, it is preferable to precisely control each of the first rotary drive unit 350 and the second rotary drive unit 360 depending on the condition and extraction capacity of beans by simultaneously driving the first rotary drive unit 350 and the second rotary drive unit 360, thereby controlling them to the optimum status.

When simultaneously driving the first rotary drive unit 350 and the second rotary drive unit 360, the main body 321 rotates around the connecting section 326, and the nozzle unit 327 linearly moves from one end of the main body 321 provided with the connecting section 326 to the other end thereof by the driving of the lead screw 366 along the lengthwise direction of the main body 321.

That is, since the nozzle unit 327 performs the linear motion, and at the same time, the main body 321 rotates about the connecting section 326, water is injected while the water to be injected draws the spiral which is gradually extended around the connecting section 326.

Thus, the nozzle 329 can extract the extraction liquid in the same manner as the hand drip extraction type. Since the first rotary drive unit 350 and the second rotary drive unit 360 are driven using each individual motor, when controlling the rotation velocity of the first motor 353 and the second motor 363, it is possible to control the expansion and contraction velocity of the spiral.

In addition, since the auto coffee drip apparatus 10 according to the present invention does not have the defined path like the conventional apparatus, it is possible to extract the extraction liquid, while drawing the various forms of spirals as follows.

Since the first rotary drive unit 350 and the second rotary drive unit 360 are driven using each individual motor, when controlling the rotational velocity of the first motor 353 and the second motor 363, it is possible to control the expansion and contraction velocity of the spiral. As an example, as the velocity of the first motor 353 is low, or as the rotational velocity of the second motor 363 is high, the number of spiral to be wound while the nozzle unit 327 is driven once along the lengthwise direction of the main body 321 decreases.

Thus, it is possible to selectively control the velocity of the first rotary drive unit 350 and the second rotary drive unit 360 depending on the status of beans and the taster's preference.

When injecting the water from the drip head module 300, the beans stored in the dripper 610 absorb the water and discharge the extraction liquid, and the weight of the dripper 610 changes at every moment. At this time, the weight sensor 220 provided in the dripper tray module 200 is able to calculate the flow rate per unit time of the extraction liquid through a change in weight of the dripper 610, and is able to calculate the extraction liquid which is extracted to the server 620 by subtracting the quantity of water remaining in the dripper 610 from the quantity of water discharged from the metering pump 410 of the boiler module 400.

To extract the drip coffee, there is a need to ripen the grinding beans, and it is also possible to perform the suitable ripening for the grinding beans using the water injection and the weight sensor 220 described above.

Figure 10:
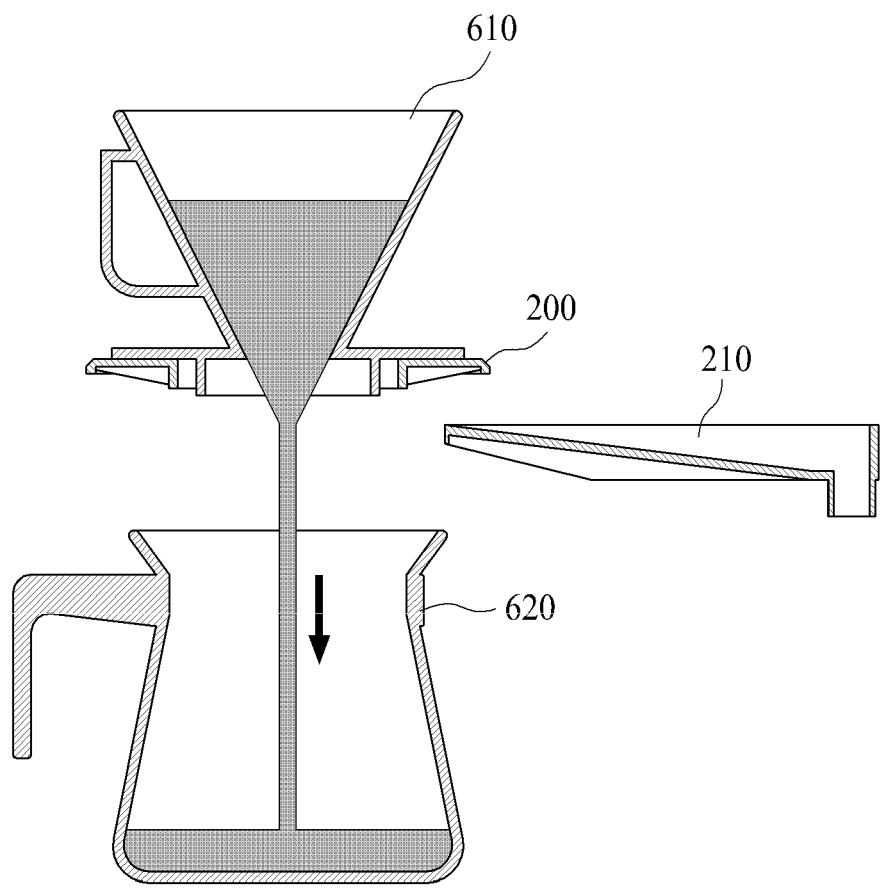
Figure 11:
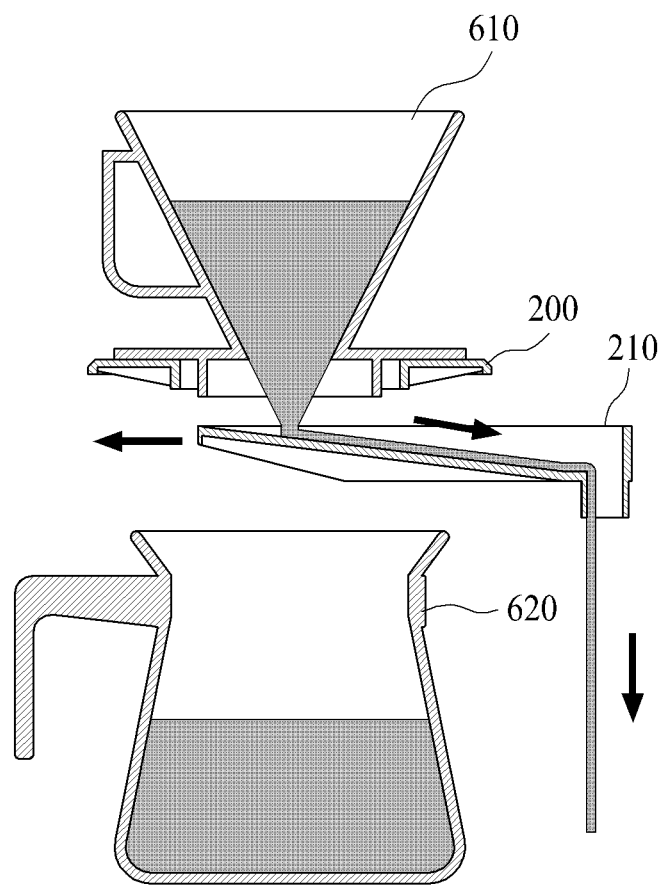
FIG. 11 is a cross-sectional view illustrating a usage aspect of a dripper tray module according to the present invention.

FIG. 10 and FIG. 11 is a cross-sectional view illustrating a usage aspect of the dripper tray module according to the present invention. When it is determined that the set quantity of extraction liquid is extracted to the drip server 620 in the control unit based on the data measured by the weight sensor 220, by driving the openable waterspout 210 provided in the dripper tray module 200, the openable waterspout 210 blocks between the dripper 610 and the server 620 to prevent the extraction liquid from continuously flowing into the drip server 620.

As illustrated in FIG. 10, in a reference status, the openable waterspout 210 is in a status of being located behind or side of the dripper tray module 200 not to prevent the extraction liquid from flowing into the server 620. In this way, the extraction liquid is extracted in the reference status, and the waterspout section 211 moves by the signal of the control unit to block the additional flowing of the extraction liquid into the drip server 620.

When it is determined that the set quantity of extraction liquid flows into the drip server 620 in the control unit, the drive signal is sent to the openable waterspout 210, the fourth motor 214 is driven by the signal, and as illustrated in FIG. 11, the waterspout section 211 moves to the position corresponding to the dripper tray module 200 through the fourth pinion gear 213 and the second rack gear 212, thereby changing the flow of the extraction liquid. The extraction liquid flowing into the waterspout section 211 is discharged to the drain water trench module 500 via the drain pipe 215.

The auto coffee drip apparatus of the present invention has the following effects.

First, there is an effect capable of obtaining the extraction liquid in the same manner as the hand drip by automatically and spirally injecting the water as in the hand drip.

Second, since the constant speed and the expansion and contraction of the spiral are controlled through the two motors, there is an effect that the resolution of the act of drawing a spiral of the water flow is enhanced to be able to extract the coffee of uniform taste.

Third, since it is possible to selectively control the auto coffee drip apparatus depending on the status of the beans and the user's preference, there is an effect capable of providing the drip coffee optimized for the user's preference.

Fourth, by providing an accurate extraction method and the extracted data to the user, there are effects that convenience and productivity are improved and it is possible to provide the extracted coffee of constant taste to a user without change.

Fifth, since the suitable setting is performed depending on the status of the beans through the control unit, there is an effect that anyone can extract the drip coffee without specialized talent.

Sixth, there is an effect that, when a set quantity of coffee is extracted to the drip server, the extraction liquid is discharged to the outside through the openable waterspout, and thus a user is capable of performing other works, while the coffee is extracted.

Seventh, there is an effect that the apparatus also is able to be effectively used to extract the beverage such as tea in addition to coffee.

The effects of the present invention are not limited to the foregoing effects, and other effects which have not been mentioned will be clearly understood to those skilled in the art from the scope of the claims.

As described above, it will be understand that the present invention can be implemented in other specific forms without changing the technical spirit or essential characteristics by those skilled in the art to which this invention belongs. Therefore, the embodiments described above should be understood as being illustrative in all aspects rather than being limited. The scope of the present invention is indicated by the claims described below rather than the detailed description, and all varied or modified forms derived from the meaning and range of the appended claims and equivalent concepts should be construed as being included the scope of the present invention.

What is claimed is:

1. An auto coffee drip apparatus comprising:
   a housing;
   a dripper tray module which is fixed to an external one side of the housing and in which a dripper storing the coffee powders is seated; and
   a drip head module having a frame which is partially exposed to a front outside of the housing and the drip head module disposed being spaced apart from the dripper tray module by a predetermined interval and injects water into the dripper, wherein the drip head module includes:
   a nozzle section which is provided on one side of the exposed portion of the frame to inject the water,
   a rotary drive unit which rotates the nozzle section, and
   a water transporting section which transports the water, wherein the rotary drive unit includes:
   a first rotary drive unit for rotating the nozzle section, and
   a second rotary drive unit for linearly moving the nozzle section, wherein the rotary drive unit spirally rotates the nozzle section, and
   wherein the nozzle section includes:
   a main body which is formed longer in a lengthwise direction along forward and backward directions of the housing, is formed with an insertion groove formed longer along the lengthwise direction on the lower one side, and is formed with through-holes provided to correspond to terminal ends of both sides of the lengthwise direction, respectively,
   a connecting section which protrudes to the upper part of the main body and is connected to the water transporting section to provide a passage through which the water can flow, and transmits the rotational force generated by the first rotary drive unit to the nozzle section, and
   a nozzle unit which is inserted into the insertion groove and linearly moves along the lengthwise direction of the insertion groove.

2. The auto coffee drip apparatus of claim 1, wherein the first rotary drive unit includes:
   a first spur gear which is coupled to an upper end of the connecting section of the nozzle section to rotate the nozzle section;
   a first pinion gear which is provided so as to mesh with the first spur gear to rotate the first spur gear; and a first motor which transmits the rotational force to the first pinion gear.

3. The auto coffee drip apparatus of claim 1, wherein the second rotary drive unit includes:
   a second spur gear which has the same rotary shaft as the first spur gear and is provided such that the connecting section of the nozzle section penetrates therethrough;
   a second pinion gear which is disposed so as to mesh with the second spur gear to rotate the second spur gear; a second motor which transmits the rotational force to the second pinion gear; a first bevel gear which is coupled to the second spur gear and rotates together with the rotation of the second spur gear;
   a second bevel gear which is connected to the first bevel gear in a direction perpendicular to the lengthwise direction of the nozzle section and rotates together with rotation of the first bevel gear; and a lead screw which is connected to a rotation center axis of the second bevel gear in the same direction as the lengthwise direction of the nozzle section and is provided to penetrate through a pair of through-holes formed in the main body of the nozzle section to rotate together with the second bevel gear, and is formed with screw threads along the lengthwise direction to linearly move the nozzle section.

4. The auto coffee drip apparatus of claim 3, wherein in the insertion groove of the main body, a guide rail is further formed along the lengthwise direction, and a protrusion corresponding to the guide rail is further included on the upper one side of the nozzle section.

5. The auto coffee drip apparatus of claim 3, further comprising a nozzle fixing section which is coupled to the nozzle section and is formed with a protrusion corresponding to the screw thread of the lead screw so as to protrude.

6. The auto coffee drip apparatus of claim 5, further comprising:
an elastic unit which elastically supports the nozzle fixing section to the lead screw side.

7. The auto coffee drip apparatus of claim 1, wherein the nozzle section includes:
a first hose connecting section which is provided on the side of the main body so as to protrude and discharges the water flowing-in through the connecting section to the outside of the main body;
a second hose connecting section which is provided on a lateral surface of the nozzle section to allow the water discharged from the first hose connecting section to flow in; and
a hose which connects the first and second connecting sections, wherein the nozzle of the nozzle section is provided so as to be connected to the second hose connecting section to inject the water in a direction of gravity.

8. The auto coffee drip apparatus of claim 1, wherein the drip head module further includes at least one of a laser module, an image sensor and a lighting section for measuring a surface height of the coffee powders stored in the dripper.

9. The auto coffee drip apparatus of claim 8, wherein on one side of the dripper, a bar code or a QR code, in which coffee powder information and drip information are input, is further provided, and the image sensor recognizes the bar code or the QR code.

10. The auto coffee drip apparatus of claim 1, wherein on one side of the dripper tray module, a weight sensor for measuring the coffee powders and a quantity of injection of water injected into the dripper is further provided.

11. An auto coffee drip apparatus comprising:
a housing;
a dripper tray module which is fixed to an external one side of the housing and in which a dripper storing the coffee powders is seated; and
a drip head module having a frame which is partially exposed to a front outside of the housing and the drip head module disposed being spaced apart from the dripper tray module by a predetermined interval and injects water into the dripper;
wherein the drip head module includes:
a nozzle section which is provided on one side of the exposed portion of the frame to inject the water,
a rotary drive unit which rotates the nozzle section,
a lifting drive unit which raises or lowers the frame to adjust the height of the nozzle section, and
a water transporting section which transports the water, wherein the lifting drive unit includes:
a fixing frame which is fixed to an internal one side of the housing,
a support column which is provided so as to be coupled to the frame through the one side of the fixing frame and is vertically formed with a rack gear,
a third pinion gear which is provided so as to mesh with the first rack gear of the support column to vertically raise and lower the support column, and
a third motor which transmits the rotational force to the third pinion gear.

12. An auto coffee drip apparatus comprising:
a housing;
a dripper tray module which is fixed to an external one side of the housing and in which a dripper storing the coffee powders is seated; and
a drip head module having a frame which is partially exposed to a front outside of the housing and the drip head module disposed being spaced apart from the dripper tray module by a predetermined interval and injects water into the dripper, wherein on the lower part of the dripper tray module, an openable waterspout for discharging the extraction liquid extracted from the dripper to the outside is further provided,
wherein the openable waterspout includes:
a waterspout section which stores and distributes the extraction liquid extracted from the dripper provided in the lower part of the dripper tray module,
a second rack gear which is formed on one side of the waterspout section,
a fourth pinion gear which is provided so as to mesh with the second rack gear to linearly move the waterspout section in one direction,
a fourth motor which is connected to the fourth pinion gear to transmit the rotational force to the fourth pinion gear, and
a drain pipe which is provided on one side of the waterspout section to discharge the extraction liquid to the outside.

13. The auto coffee drip apparatus of claim 12, wherein on the internal lower one side of the housing corresponding to a position at which the dripper tray module is provided, a drain water trench module for recovering the extraction liquid discharged via the drain pipe and the water arbitrarily flowing out of the nozzle section is further provided, and on one side of the housing in which the drain water trench module is provided, a drain hole may be formed so that the extraction liquid or the water can flow into the drain water trench module.

* * * * *